(12) United States Patent
Tufts (10) Patent No.: US 7,159,023 B2
(45) Date of Patent: Jan. 2, 2007

(54) USE OF WEB USAGE TRAIL DATA TO IDENTIFY RELATIONSHIPS BETWEEN BROWSABLE ITEMS

(75) Inventor: Patrick Tufts, Berkeley, CA (US)

(73) Assignee: Alexa Internet, San Fancisco, CA (US)

( * ) Notice: Subject to any disclaimer, the term of this patent is extended or adjusted under 35 U.S.C. 154(b) by 610 days.

(21) Appl. No.: 10/737,168

(22) Filed: Dec. 16, 2003

(65) Prior Publication Data

US 2004/0205516 A1    Oct. 14, 2004

Related U.S. Application Data

(63) Continuation of application No. 09/470,844, filed on Dec. 23, 1999, now Pat. No. 6,691,163.

(51) Int. Cl.
*G06F 15/173* (2006.01)

(52) U.S. Cl. ............................ 709/224; 709/223

(58) Field of Classification Search ........... 709/224, 709/223; 705/52
See application file for complete search history.

(56) References Cited

U.S. PATENT DOCUMENTS

| | | |
|---|---|---|
| 5,583,763 A | 12/1996 | Atcheson et al. |
| 5,749,081 A | 5/1998 | Whiteis |
| 5,801,702 A | 9/1998 | Dolan et al. |
| 5,832,494 A | 11/1998 | Egger et al. |
| 5,895,470 A | 4/1999 | Pirolli et al. |
| 6,055,572 A | 4/2000 | Saksena |
| 6,112,202 A | 8/2000 | Kleinberg |
| 6,112,203 A | 8/2000 | Bharat et al. |
| 6,131,110 A | 10/2000 | Bates et al. |
| 6,138,113 A | 10/2000 | Dean et al. |
| 6,182,091 B1 | 1/2001 | Pitkow et al. |
| 6,202,056 B1 * | 3/2001 | Nuttall ................... 705/52 |
| 6,230,153 B1 | 5/2001 | Howard et al. |
| 6,266,649 B1 | 7/2001 | Linden et al. |
| 6,282,548 B1 | 8/2001 | Burner et al. |
| 6,286,006 B1 | 9/2001 | Bharat et al. |
| 6,286,018 B1 | 9/2001 | Pitkow et al. |
| 6,334,145 B1 | 12/2001 | Adams et al. |
| 6,336,112 B1 | 1/2002 | Chakrabarti et al. |
| 6,363,348 B1 | 3/2002 | Besling et al. |

(Continued)

FOREIGN PATENT DOCUMENTS

WO        0125947 A1    4/2001

OTHER PUBLICATIONS

U.S. Appl. No. 09/345,611, filed Jun. 28, 1999, assigned to Alexa Internet.

(Continued)

*Primary Examiner*—Krisna Lim
(74) *Attorney, Agent, or Firm*—Knobbe, Martens, Olson & Bear LLP (57) ABSTRACT

Related web locations are identified from the web usage trails of a population of users. Each usage trail is preferably in the general form of a sequence of URLs accessed by a user during a browsing session. The usage trails are preferably collected using a special client application that operates in conjunction with a web browser and reports the navigation activities of users. In a preferred embodiment, the relatedness of two web locations A and B is determined using a minimum sensitivity calculation that takes into consideration the number of transitions that occurred between A and B relative to the total number of transitions that involved A and/or B. The method may be used independently, or may be used in combination with other methods for identifying related web locations.

25 Claims, 6 Drawing Sheets

U.S. PATENT DOCUMENTS

| | | | |
|---|---|---|---|
| 6,366,298 B1 * | 4/2002 | Haitsuka et al. | 715/736 |
| 6,397,218 B1 | 5/2002 | Stern et al. | |
| 6,397,256 B1 * | 5/2002 | Chan et al. | 709/229 |
| 6,418,433 B1 | 7/2002 | Chakrabarti et al. | |
| 6,460,036 B1 | 10/2002 | Herz | |
| 6,466,970 B1 | 10/2002 | Lee et al. | |
| 6,470,383 B1 * | 10/2002 | Leshem et al. | 709/223 |
| 6,484,136 B1 | 11/2002 | Kanevsky et al. | |
| 6,486,895 B1 | 11/2002 | Robertson et al. | |
| 6,499,034 B1 * | 12/2002 | Mackinlay | 707/102 |
| 6,505,201 B1 * | 1/2003 | Haitsuka et al. | 707/10 |
| 6,549,896 B1 | 4/2003 | Candan et al. | |
| 6,553,417 B1 * | 4/2003 | Gampper | 709/224 |
| 6,606,653 B1 | 8/2003 | Ackermann et al. | |
| 6,691,163 B1 | 2/2004 | Tufts | |
| 6,782,370 B1 | 8/2004 | Stack | |
| 2003/0074639 A1 | 4/2003 | Schuetze et al. | |

OTHER PUBLICATIONS

Dependent Bigram Identification—Ted Pedersen—Proceedings of the Fifteenth National Conference on Artificial Intelligence, dated Jul. 1998.

Home Page of Ted Pedersen—Printed from www.d.umn.edu/~tpederse/ on Nov. 17, 1999.

Alexa Internet Integrates Related Links and Archive of The Web Info Internet Explorer 5 Release—www.alexa.com/company/inthenews/msie5_alexa_integration.html.

Combined Log System—David Beckett—Computer Networks and ISDN Systems 27 (1995) 1089-1096.

Footprints: History-Rich Tools for Information Foraging—Alan Wexelblat, Pattie Maes—CHI '99 May 15-20, 1999.

Searching For Less, Not More—Critics—New York Times, Sep. 30, 1999.

Hypersearching The Web—Scientific American: Feature Article—Jun. 1999.

Toyoda, et al., Finding Related Communities in the Web, 1999, www.tkl.iis.u-tokyo.ac.jp, pp. 1-2.

Dean, et al., Finding related pages in the World Wide Web, Mar. 1999, Elsevier Science, pp. 390-401.

Pirolli, et al., Silk froma Sow's Ear: Extracting Usable Structures from the Web, Xerox, pp. 1-14.

Cooley, et al., Data Preparation for Mining World Wide Web Browsing Patterns, University of Minnesota.

Chakrabarti, Recent results in automatic Webv resource discovery, 2000, ACM, pp. 1-7.

Kleinberg, Authorative sources in a hyperlinked environment, Sep. 1999, ACM, pp. 604-632.

Kumar, et al., Trawling the Web for emerging cyber-communities, www8.org, pp. 1-18.

Guan, et al., KPS: a Web information mining algorithm, Elsevier Science, pp. 417-429.

Pedersen, Dependent Bigram Identification, 1998, American Association for Artificial Intelligence.

Objectivity for Java Guide, 1998, Objectivity, Inc., pp. 123-132.

Agrawal, R., Imielinski, T., and Swami, A., "Mining Association Rules between Sets of Items in Large Databases." Proceedings of the 1993 ACM SIGMOD International Conference on Management Data, pp. 207-216. (1993).

M. Roscheisen et al., "Beyond browsing: shared comments, SOAPs, trails, and on-line communities," Computer Networks and ISDN Systems 27 (1995), pp. 739-749.

Srikant, R., and Agrawal, R., "Mining Sequential Patterns: Generalizations and Performance Improvements," Proceedings of the 5th International Conference on Extending Database Technology, pp. 3-17. (1996) (ISBN:3-540-61057-X).

* cited by examiner

USE OF WEB USAGE TRAIL DATA TO IDENTIFY RELATIONSHIPS BETWEEN BROWSABLE ITEMS

PRIORITY CLAIM

This application is a continuation of U.S. application Ser. No. 09/470,844, filed Dec. 23, 1999, now U.S. Pat. No. 6,691,163, the disclosure of which is hereby incorporated by reference.

BACKGROUND OF THE INVENTION

1. Field of the Invention

This invention relates generally to the Internet and the World Wide Web (web) and, more particularly, to methods for determining the relatedness of web sites and web pages.

2. Description of the Related Art

The Internet has become a convenient and popular medium for the exchange of information and the transacting of commerce. An Internet user has access to a vast number of web sites on the World Wide Web and this number is increasing at a rapid pace. For any one web site (hereinafter "subject web site"), there frequently exist numerous other related web sites that offer the same or similar information, services, or products.

A number of systems and methods are known for identifying links to web sites, or pages thereof, that are related to a web site or other item of interest (hereinafter "related links"). One method for identifying related links involves examining link structures of web pages to identify relationships between particular pages or sites. For example, a relationship between web sites A and B may be deemed to exist if a significant portion of the web pages having links to A also have links to B. Another method involves performing a text-based analysis of web pages to identify pages or sites with similar content.

The related links identified through these or other methods may be presented to the user through a special client program, which may be a browser plug-in, that displays metadata for the web site or page currently being viewed. The client program typically retrieves the metadata on a URL-by-URL basis from a metadata server. A client program and associated service that operate in this manner are commercially available from Alexa Internet, the assignee of the present application. The related links may also be displayed in other contexts, such as in conjunction with search results from an Internet search engine.

One limitation associated with using link structures and textual content of web pages to identify related links is that large numbers of web pages generally must be retrieved and parsed in order to obtain satisfactory results. Another limitation is that the breadth of the related links data is typically dependent upon the ability of a web crawling program to locate web pages. Because of these limitations, the resulting related links may be based on only a small percentage of existing web pages. The present invention seeks to overcome these limitations while providing an additional measure of the relatedness of web sites.

SUMMARY

The present invention comprises a method for generating related links from the web usage trails of a population of users. Each usage trail is preferably in the general form of a sequence of URLs or domain names accessed by a user during a browsing session. The usage trails are preferably collected from users of a special client application of the type described above, but may additionally or alternatively be obtained from another source of usage trail data such as an ISP (Internet Service Provider). The method may be used independently, or may be used in combination with other methods (such as those mentioned above) to improve the breadth and reliability of the related links data.

In the preferred embodiment, the relatedness of two web sites or pages A and B is determined using a sensitivity calculation, which is preferably a minimum sensitivity calculation. The sensitivity calculation takes into consideration the number of transitions between A and B relative to the total number of transitions that involve A and/or B within a set of usage trail data. More specifically, the minimum sensitivity between A and B for a set of usage trail data is preferably determined by dividing the number of transitions between A and B by the greater of (i) the total number of transitions between A and all web sites and (ii) the total number of transitions between B and all web sites. In one embodiment, only one-step (direct) transitions between A and B are incorporated into the calculation. In other embodiments, transitions that involve more than one step may be recognized. Additional information extracted from the usage trails, such as the time spent between transitions and the user actions performed at a particular site, may optionally be taken into consideration within the sensitivity calculations.

The sensitivity calculations may, for example, be performed for all pairs of web sites reflected within the usage trail data, or for all pairs of web sites that co-occur within at least one usage trail. For each subject site or page A, the other web sites or pages X for which the minimum sensitivity score, MS (A, X), is highest are deemed to be the most closely related to A. Links to such other pages or sites are thus stored as the related links for A.

BRIEF DESCRIPTION OF THE DRAWINGS

Referring now to the drawings in which like reference numbers represent corresponding components throughout.

DETAILED DESCRIPTION OF THE EMBODIMENTS

A number of embodiments of the present invention will now be described with reference to the drawings. Throughout the description, reference will be made to various implementation-specific details. These details are provided in order to fully illustrate the embodiments of the invention, and not to limit the scope of the invention. The scope of the invention is set forth in the appended claims.

I. Overview and System Components

The present invention provides a method and system for determining the relatedness of web sites and/or web pages based upon usage trail data. The usage trail data includes information about sequences of web sites visited by users of the World Wide Web. The relatedness of web sites is preferably used to present to a user a list of hypertext links to web sites, or specific pages thereof, that are deemed to be related to the web site or page being browsed by the user (hereinafter "related links"). The methods of the present invention may also be used in combination with other techniques for identifying related links, such as those that use web page text and/or web page links to measure relatedness.

Figure 1:
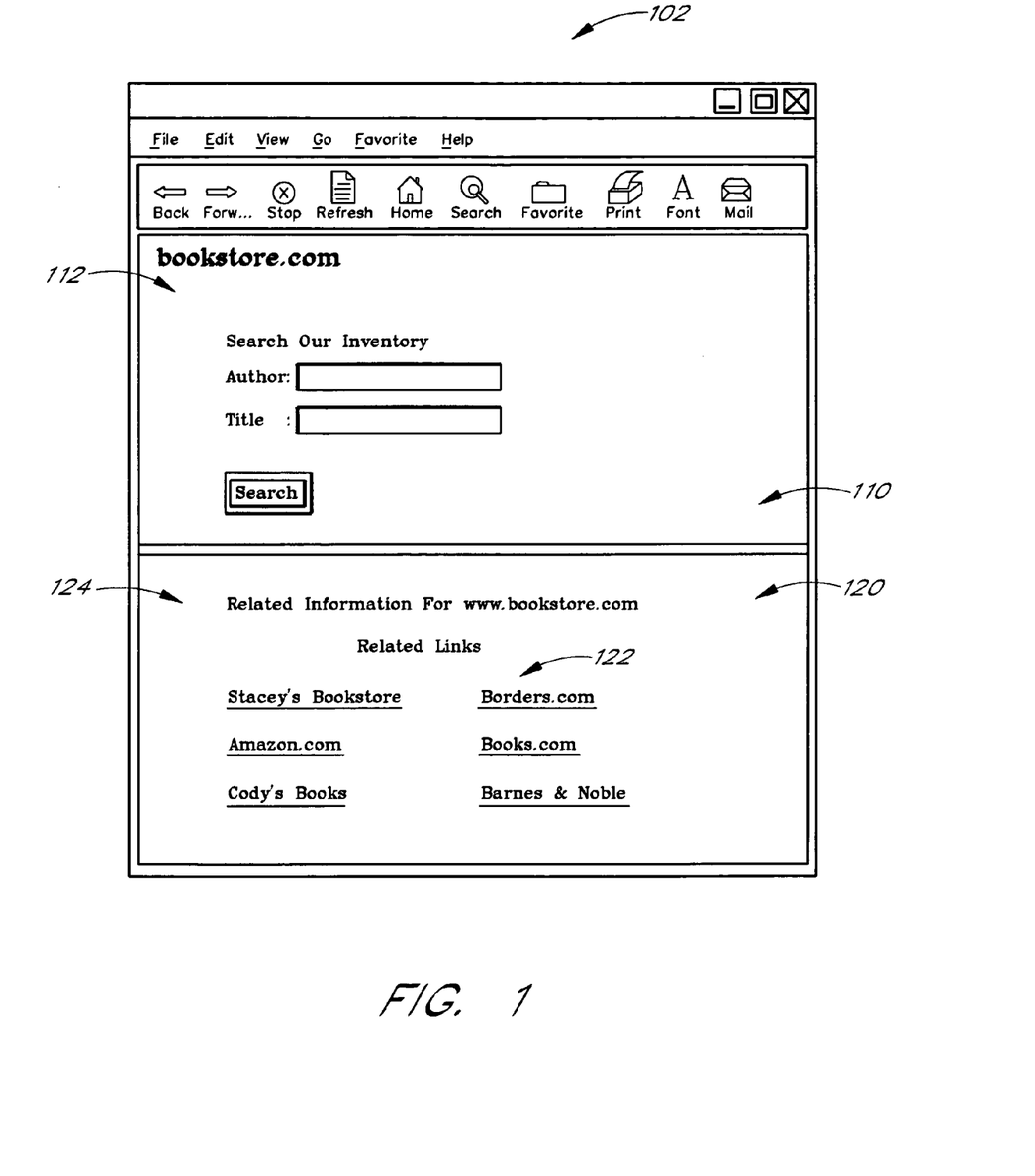
FIG. 1 illustrates an example web browser window showing the use of related links.

FIG. 1 illustrates an example web browser window 102 showing the use of related links. A web page 112 from an Internet book retailer, for example, bookstore.com, is displayed in a main frame 110 of the web browser window 102. Related information about the web site being browsed is displayed in a second frame 120 of the web browser window 102. The related information includes a list of related links 122. In the illustrated example, the list of related links 122 includes links to other Internet book merchants. The user can click on any of the related links 122 to direct the main frame 110 of the web browser to a related web site. The related information also preferably includes other information (not illustrated) about the web site being browsed, such as, for example, contact information for the web site owner and web site visitation statistics. In general, the related information about a web site will be referred to herein as metadata. Accordingly, the web page displayed in the second frame 120 can be referred to as a metadata page 124.

Figure 2:
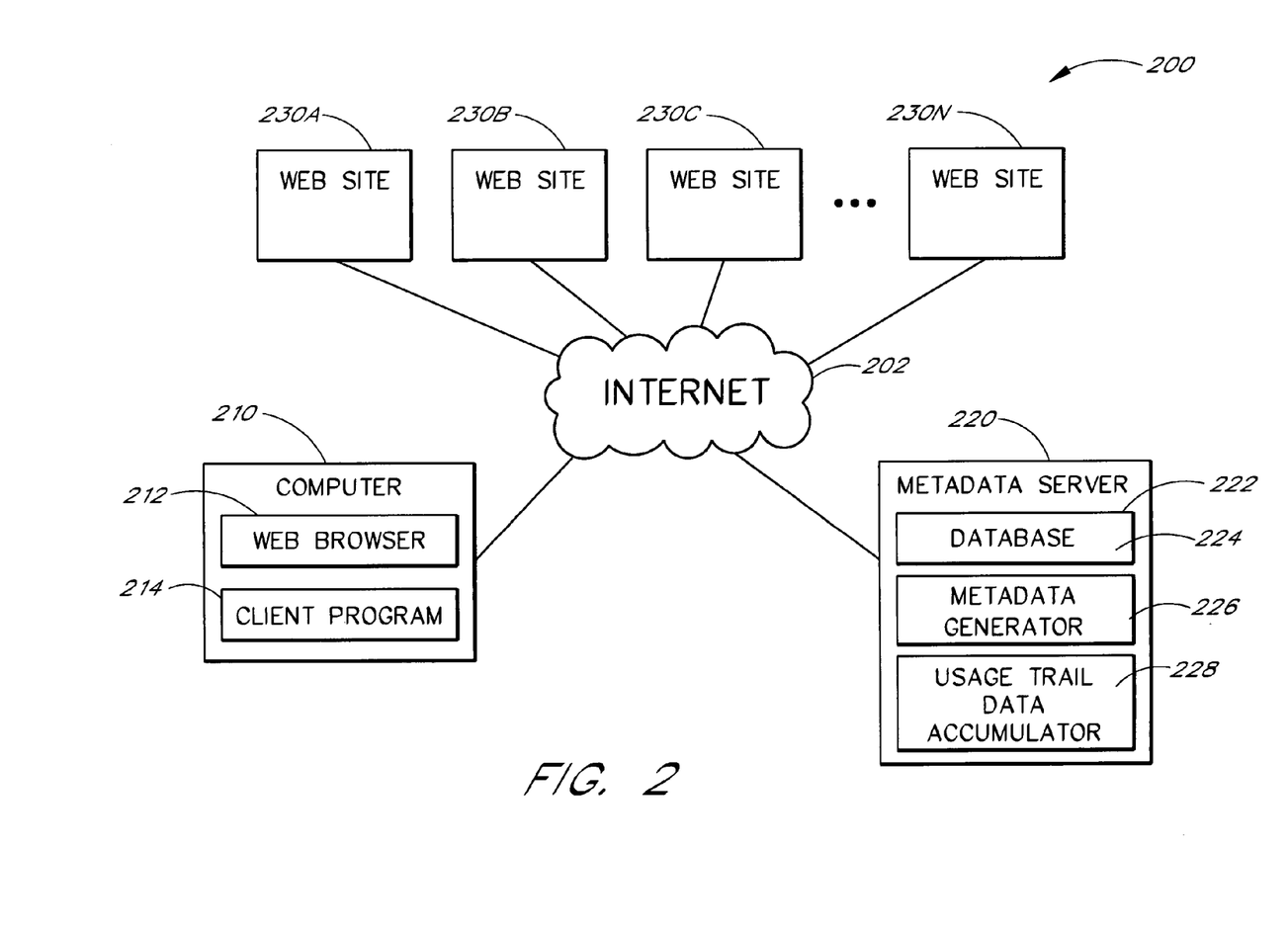
FIG. 2 illustrates the principal components of a preferred embodiment of a system for determining the relatedness of web sites based upon usage trail data.

FIG. 2 illustrates an embodiment of a system 200 that can be used to display metadata, including related links, to a user. The system 200 can also be used to accumulate usage trail data based upon which the relatedness of web sites can be determined in accordance with the present invention.

A user computer 210, a metadata server 220, and multiple web sites 230A–N communicate through a computer network 202, preferably the Internet. FIG. 2 shows four web sites 230 A, B, C, and N for purposes of illustration, however, any number of web sites 230 may be present. The web sites 230A–N preferably include most or all of the web sites accessible on the World Wide Web. Each web site 230A–N is preferably supported by a web server and comprises a number of web pages and the associated programs and/or scripts necessary to support the web pages. A user accesses the web pages of the web sites 230A–N through a web browser 212 running on the user computer 210.

A client program 214 runs in conjunction with the web browser 212 on the user computer 210 and monitors hypertext transfer protocol (HTTP) traffic between the web browser 212 and any web sites. Whenever the web browser 212 sends out an HTTP request for a web page, the client program 214 captures a copy of the uniform resource locator (URL) of the requested page and relays the URL to the metadata server 220. In response, the metadata server 220 returns to the client program 214 a metadata page for the web page and/or site identified in the captured URL. The client program 214, upon receiving the metadata page from the metadata server 220, displays the metadata page to the user through the web browser 212 as illustrated in FIG. 1.

The metadata server 220 preferably includes a database 224, a metadata generator 226, and a usage trail data accumulator 228. The usage trail data accumulator 228 preferably collects usage trail data. The metadata generator 226 preferably creates metadata and/or metadata pages. The database 224 preferably stores usage trail data collected by the usage trail data accumulator 228, metadata created by the metadata generator 226, and/or metadata pages. In one embodiment the metadata generator 226 creates the metadata page upon request using information stored in its database 224. In another embodiment, the metadata generator 226 generates metadata pages in advance and stores them on the database 224 for subsequent retrieval by the metadata server 220. In alternative embodiments, the database 224, the metadata generator 226, and the usage trail data accumulator 228 can be located on or can execute on separate computers or servers that preferably communicate with the metadata server 220.

In accordance with the present configuration, when the client program 214 is running on the user computer 210, the metadata server 220 receives a complete sequence of URLs requested by the browser. The usage trail data accumulator 228, through the metadata server 220, preferably tracks both the sequence of web pages and web sites accessed by a user. In the preferred embodiment, each usage trail identifies the sequence of web pages or web sites accessed by a user in a single browsing session. In other embodiments, all browsing sessions performed by the user over some period of time, such as one day, may be combined to form a usage trail.

A vast amount of usage trail data can be obtained and catalogued by recruiting users to each use an instance of the client program 214 to view web site metadata while browsing the web. Although a single user computer 210 is shown in FIG. 2, the metadata server 220 stores usage trail data for and serves metadata to the several users (e.g. all users that have installed the client program 214 on their respective user computers). In order to generate reliable and comprehensive related link data from usage trails, it is desirable that the number of users be large (e.g. over 100,000).

A metadata client/server system of the type shown in FIG. 2 is disclosed in U.S. patent application Ser. No. 08/880,117 filed Jun. 21, 1997, titled METHOD AND APPARATUS FOR AUGMENTING A WEB PAGE WITH METADATA, and Ser. No. 09/345,611 filed Jun. 28, 1999, titled SYSTEM AND METHOD FOR GENERATING META-DATA FOR WEB PAGES DOWNLOADABLE OVER A NETWORK SUCH AS THE WORLD WIDE WEB OR THE LIKE, which are assigned to the assignee of the present application and are hereby incorporated by reference. In an existing commercial implementation of the system, the client program 214 is a browser helper object or browser plug-in that is available as a free download from the Alexa.com web site.

In additional embodiments, other methods for collecting usage trail data can be used. For example, Internet service providers (ISPs) such as America Online or Mindspring typically have access to all of the HTTP requests made by their customers. ISPs are therefore in a strategic position to identify, track, and catalog usage trail data from their customers without the use of a special client program. In this case the usage trail data accumulator 228 may be most effectively operated by an ISP. The ISP or another entity could then use a metadata generator 226 to process the accumulated usage trail data in order to generate related links.

II. Process for Determining Relatedness

In accordance with the present invention, the relatedness of two web sites (or pages) A and B is determined using a sensitivity calculation that takes into consideration the number of transitions between A and B, the number of transitions between A and other web sites, and/or the number of transitions between B and other web sites. In the preferred embodiment, the sensitivity calculation is a minimum sensitivity calculation. This process for determining relatedness of web sites is based on the assumption that web sites or pages accessed by the user during a browsing session, and/or within some threshold number of web site transitions from one another, tend to be related.

For any two web sites A and B, a transition between site A and site B in a usage trail can be either an accessing of site A followed by an accessing of site B, or an accessing of site B followed by an accessing of site A. In the preferred embodiment, the only type of transition recognized between web sites A and B is a 1-step transition, meaning that site B is the first site browsed immediately after site A, or vice versa. In an alternative embodiment, the transition between web sites A and B can be an n-step transition, meaning that site B is the n-th site browsed after site A, or vice versa. In still other embodiments, the transition between web sites A and B can be an m to n step transition, meaning that B is at least the m-th site and at most the n-th site browsed after site A, or vice versa.

Figure 3:
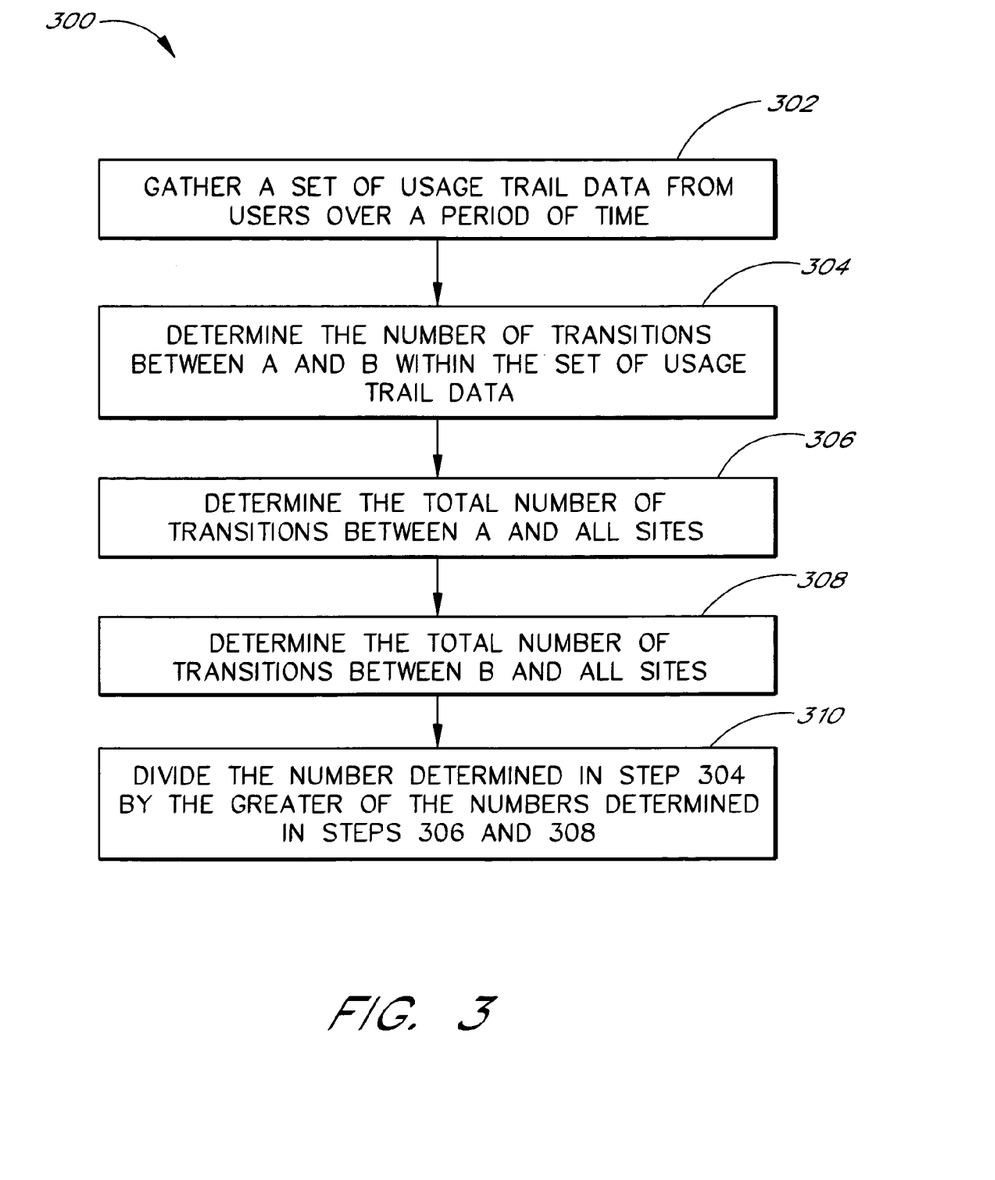
FIG. 3 illustrates a flowchart of an embodiment of a process that uses a minimum sensitivity calculation based upon transitions between web sites to determine the relatedness of web sites using usage trail data.

FIG. 3 illustrates a flowchart 300 of a preferred embodiment that uses a minimum sensitivity calculation based upon transitions between web sites to determine the relatedness of web sites using usage trail data. The process is preferably implemented by the metadata server 226 (FIG. 2). In a first step 302, a sample set of usage trail data is gathered from users over a period of time. At step 304, the number of transitions between a web site A and a web site B is determined. At step 306, the number of transitions between web site A and all web sites is determined. This number is preferably the total number of transitions between A and any site in the set of usage trail data. Preferably included in the number of transitions are those between A and B, A and any other web site N, and so on. Transitions from A to A can be included as well, preferably in the case that the determination involves at least 2-step transitions. Similarly, at step 308, the number of transitions between web site B and all web sites is determined. At step 310, the number determined in step 304 is divided by the greater of the numbers determined in step 306 and step 308.

The calculations performed in steps 304–310 can also be described as follows: divide the number of transitions between web sites A and B by the greater of (i) the number of transitions between A and all web sites and (ii) the number of transitions between B and all web sites. The result of the calculation of step 310 is the minimum sensitivity between web sites A and B. In the preferred embodiment, the minimum sensitivity has a range of 0 to 1 inclusive. A minimum sensitivity of 0 indicates that no transitions occur between web sites A and B in the sample set of usage trail data. A minimum sensitivity of 1 indicates that any transitions involving A or B are always between A and B. In the preferred embodiment, minimum sensitivity is used as a measure of the relatedness of two web sites.

Figure 4:
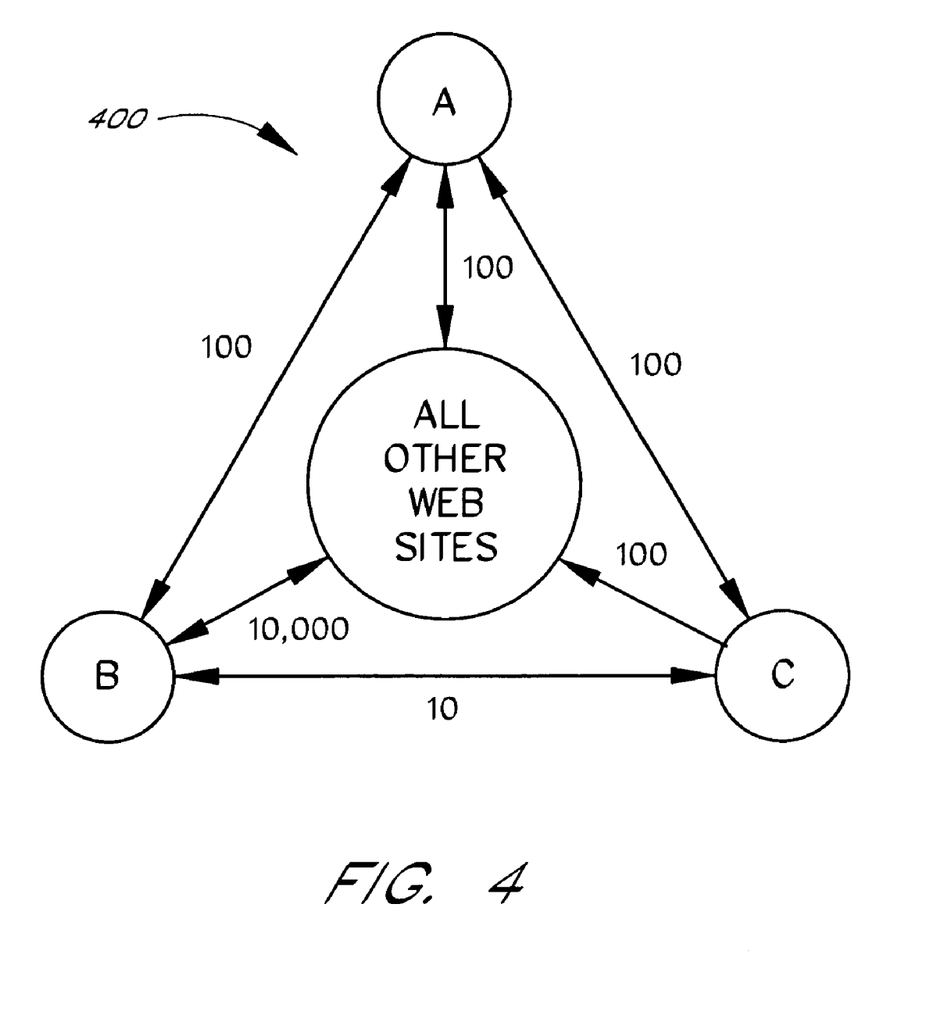
FIG. 4 illustrates a schematic of a hypothetical set of usage trail data including transitions between three web sites, A–C, and all other web sites accessed in the set of usage trail data.

FIG. 4 illustrates a schematic 400 of a hypothetical set of usage trail data including transitions between three web sites, A–C, and all other web sites accessed in the set of usage trail data. Each of the web sites A–C is represented by a circle and all of the other web sites accessed within the set are represented by another circle. Transitions are indicated by bi-directional arrows between the circles. The number of occurrences of each transition within the set of usage trail data is indicated by a number next to each bi-directional arrow. The minimum sensitivity between web sites A and B can be calculated as follows:

Step 304: 100 transitions between A and B;
Step 306: 300 transitions between A and all web sites (A has three incident arrows, each representing 100 transitions for a total of 300 transitions);
Step 308: 10110 transitions between B and all web sites (B has three incident arrows with a total of 10110 transitions);
Step 310: minimum sensitivity, MS (A, B)=100/MAX (300, 10110)≅0.01.

Similarly, the remaining minimum sensitivities can be calculated as follows:

MS (A, C)=100/MAX (300, 210)≅0.33
MS (B, C)=10/MAX (10110, 210)≅0.001

Note that the present minimum sensitivity calculation is symmetric, MS (A, C)=MS (C, A), since the transitions do not take direction into account. The minimum sensitivity calculation, however, is not symmetric when directional transitions are used as will be discussed below.

The hypothetical set of usage trail data illustrated by the schematic 400 might represent three web sites as follows:

Web site A: Alexbooks.com;
Web site B: Bigbooks.com;
Web site C: Chrisbooks.com.

Suppose the Bigbooks web site is very popular and experiences relatively high volume sales. The 16000 transitions between Bigbooks and all other web sites might indicate that many users transition from other web sites to Bigbooks. Alexbooks and Chrisbooks could be smaller book retailers that cater to more focused groups of consumers. The 100 transitions between each of Alexbooks and Chrisbooks and all other web sites indicates this smaller volume. Since there are 100 transitions between Alexbooks and Chrisbooks, users have likely found some relationship between the two web sites. This relationship is reflected by the minimum sensitivity of 0.33 between Alexbooks and Chrisbooks. Although there are also 100 transitions between Alexbooks and Bigbooks, this number is quite small compared to the total number of transitions between Bigbooks and all other web sites (10110), and therefore the minimum sensitivity is 0.01 between Alexbooks and Bigbooks. Accordingly, based upon the minimum sensitivity calculation, Chrisbooks is more related to Alexbooks than Bigbooks. Similar analyses can be applied to the relatedness of Bigbooks to Alexbooks and Chrisbooks, and for Chrisbooks to Alexbooks and Bigbooks.

The steps 304–308 of flowchart 300 are preferably implemented using a database and by applying sorting, matching, cataloguing, and/or categorizing functions to the usage trail data gathered in step 302. Depending upon the objectives of the implementation and the desired accuracy of the sensitivity measure, approximation measures, rounding, and other methods that will be apparent to one skilled in the art can be used to gain efficiencies in the determinations of steps 304–308.

In the preferred embodiment, web sites are identified by the domain name portions of their URLs. Personal home pages and their associated pages are preferably also considered web sites, but are identified, in addition, by their locations (relative or absolute pathnames) on their host systems. A table of web site aliases may also be used to identify different domain names that refer to the same web site.

In the preferred embodiment, all of the steps 304–308 of flowchart 300 are based upon 1-step transitions determined from the sample set of usage trail data. In addition, transitions through certain types of web sites, such as web portals and search engines may by filtered out of a usage trail or not considered in identifying a transition. For example, a user may transition from a search engine site to a first site of interest. Next, the user may transition back to the search engine and then to a second site of interest. By filtering out the transition to the search engine between the first and second web sites, the possibility that the first and second web sites are related is captured in the usage trail data.

In alternative embodiments, an n-step transition or an m-n step transition can be used in all of the steps. In still other embodiments, 1-step, n-step, and m-n step transitions can be combined in each or all of the steps 304–308 in order to modify the characteristics of the resulting sensitivity calculation. For example, the various types of transitions can be combined by weighting each type of transition in each step 304–308. In a more specific example, the number of 1-step transitions and the number of 2-step transitions between A and B could each be weighted by 0.5. The weighted numbers could be added to yield a combined number of transitions that takes into account both 1-step and 2-step transitions. The combined number of transitions from steps 304–308 could then be used to perform the last step 310 of the sensitivity calculation. As another alternative, a sensitivity can be determined for each of two or more types of transitions, and the resulting sensitivities can be combined by weighting. For example, a 1-step sensitivity and a 2-step sensitivity can each be calculated between A and B in accordance with steps 304–310. The two sensitivities can then be combined, for example, by weighting each by a factor, such as 0.5, and adding the weighted sensitivities.

In some embodiments, the sensitivity need not be a minimum sensitivity. In one embodiment, for example, the action of selecting the greater of two numbers in the step 310 can be omitted. The calculated sensitivity could be the number of transitions between web sites A and B divided by the number of transitions between A and all web sites. In another embodiment, the calculated sensitivity could be the number of transitions between web sites A and B divided by the number of transitions between all web sites and B. In still another embodiment the number of transitions between A and B could be divided by the sum of (i) the number of transitions between A and all web sites and (ii) the number of transitions between B and all web sites.

In additional embodiments, equivalent metrics to numbers of transitions could be used in the sensitivity calculation, such as, for example, frequencies of transitions. As another example, in steps 306 or 308, the number of transitions between A and B could be excepted from the number of transitions between A and all sites, or the number of transitions between B and all sites, respectively.

The process of flowchart 300 is preferably repeated to calculate a sensitivity for all pairs of web sites between which transitions exist in the sample set of usage trail data. In addition, the sensitivity calculation may be modified to incorporate other types of information that may also be captured in conjunction with the usage trail data. For example, page request timestamps may be used to determine how long it took a user to navigate from web site A to web site B, and this time interval may be used to appropriately weight or exclude from consideration the transition from A to B. In addition, a transition between A and B could be given greater weight if a direct link exists between web sites A and B as may be determined using an automated web site crawling and parsing routine.

The process of flowchart 300 for determining the relatedness of web sites, and the variations described above, can also be applied in determining the relatedness of web pages in addition to or instead of web sites. In this case, for any two web pages A and B, a transition between A and B in a usage trail can be either an accessing of page A followed by an accessing of page B, or an accessing of page B followed by an accessing of page A. Like a transition between web sites, a transition between web pages A and B can be a 1-step transition, an n-step transition, or an m-n step transition, where a step involves the following of a link from one page to a next.

The process illustrated in flowchart 300 can also be adapted to determine the relatedness of a web site A to a web site B (as opposed to the relatedness between web sites A and B) based upon directional transitions. A transition from a web site A to a web site B in a usage trail is an accessing of site A followed by an accessing of site B. A transition from a web site A to a web site B is a subset of a transition between A and B in that it includes a transition in only a single direction.

Figure 5:
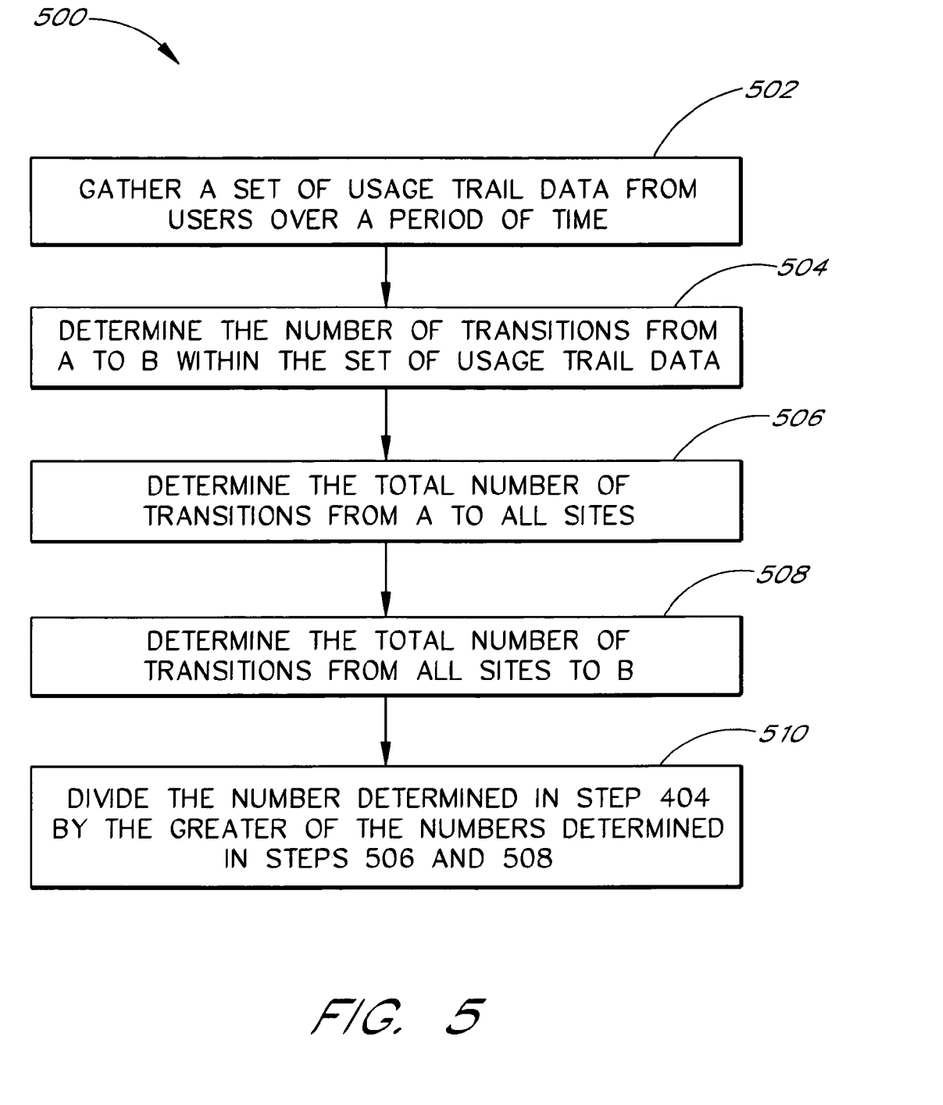
FIG. 5 illustrates a flowchart of an embodiment of a process for determining a minimum sensitivity from a web site A to a web site B based upon directional transitions.

FIG. 5 illustrates a flowchart 500 of an embodiment of a process for determining a minimum sensitivity from web site A to web site B based upon directional transitions. In step 502 of the flowchart 500, a sample set of usage trail data is gathered from users over a period of time. At step 504, the number of transitions from a web site A to a web site B is determined. At step 506, the number of transitions from web site A to all web sites is determined. This number is preferably the total number of transitions from A to any site in the set of usage trail data. At step 508, the number of transitions from all web sites to web site B is determined. At step 510, the number determined in step 504 is divided by the greater of the numbers determined in step 506 and step 508.

The calculations performed in steps 504–510 can also be described as follows: divide the number of transitions from web site A to web site B by the greater of (i) the number of transitions from A to all web sites and (ii) the number of transitions from all web sites to B. 1-step, n-step, and m-n step directional transitions can be used in conjunction with the process of flowchart 500 to determine a minimum sensitivity from a web site A to a web site B. In the preferred embodiment, the minimum sensitivity has a range of 0 to 1 inclusive. A minimum sensitivity of 0 indicates that no transitions occur from web site A to web site B in the sample set of usage trail data. A minimum sensitivity of 1 indicates that all transitions from web site A are to web site B. Sensitivity based upon directional transitions can be used as a measure of the relatedness of a web site A to a web site B.

In general, the variations and alternative embodiments described with reference to the process of flowchart 300 above are also applicable to the process of flowchart 500. Furthermore, the directional transitions can also be used in conjunction with the process of flowchart 300. For example, directional transitions can be weighted based upon the direction of the link and then the weighted directional transition can be counted as a regular non-directional transition in the process of flowchart 300. Furthermore, other factors, such as those describe above, can be used to determine how much to weight a particular transition. For example, a transition may be given an increased weight if it is detected that a user makes a purchase, performs a search, or performs some other type of transaction at a web site following the transition.

III. Generating and Presenting Related Links

Figure 6:
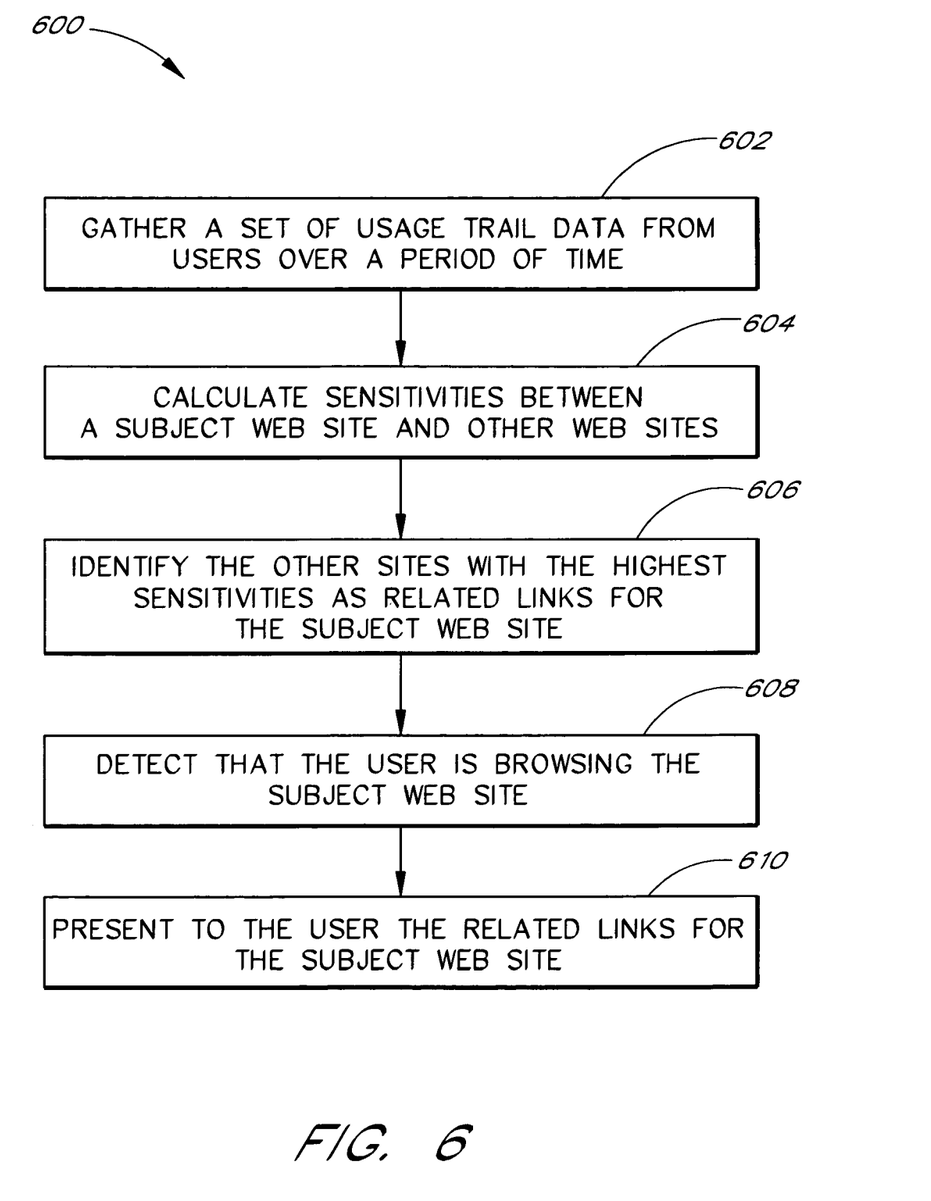
FIG. 6 illustrates a flowchart of an embodiment of a process for generating and presenting related links for a subject web site to a user.

FIG. 6 illustrates a flowchart 600 of one embodiment of a process for generating and presenting related links for a subject web site to a user. It is presumed that the system 200 is in operation at the top of flowchart 600 and that several users each use a client program 214 on their respective computers 210 to obtain and display metadata for web sites over a period of time.

At a first step 602, which is preferably similar to or identical to steps 302 and 502, the usage trail data accumulator 228 collects usage trail data provided by the client programs 214 in their requests to the metadata server 220 for metadata pages. In the preferred embodiment, the usage trail data accumulator 228 gathers usage trail data over a period of approximately four weeks from the existing users of the system 200 (there were approximately 800,000 users as of mid 1999 in the Alexa.com implementation). The time period may be varied substantially to reflect the actual number of users and other considerations.

At step 604, the metadata generator 226 calculates the sensitivities between a subject web site and other web sites. The sensitivity calculation is preferably a minimum sensitivity calculation. The subject web site may be any web site for which related links are to be created and for which there is at least one transition within the usage trail data. The other web sites are preferably all web sites having at least one transition in common with the subject web site within the usage trail data. Web sites that are not identified in at least one transition can be effectively dropped from consideration as potential related links as their sensitivities would be zero.

At step 606 the metadata generator 226 identifies the other sites with the highest sensitivities as related links for the subject web site. The related links are preferably the domain names of the identified related web sites. Alternatively, the metadata generator 226 can select a page on a related web site, preferably a root or "home" page, and create a related link to the page. In the preferred embodiment, approximately eight related links are identified. In alternative embodiments, however, any number of related links could be identified.

The metadata generator 226 preferably performs steps 604 and 606 for each subject web site for which there is at least one transition in the usage trail data. The metadata generator 226 preferably stores the resulting lists of related links on the database 224 for subsequent retrieval. The metadata generator 226 preferably stores the list of related links for each web site based upon a canonicalized URL, which is a transformed version of a URL that is easier to catalog and that eliminates appended transient data from the URL.

After the metadata generator 226 performs steps 604 and 606 for each subject web site, the metadata server 220 awaits a request for metadata from the client program 214 for one of the subject web sites. In an alternative embodiment, the metadata server 220 may perform the steps 604–606 instead of or in conjunction with the metadata generator 226. In the preferred embodiment, the sequence of steps 602–606 involved in generating related links is repeated periodically, such as every four weeks.

At step 608 the metadata server 220 receives a request for metadata from the client program 214 for a web site being browsed by a user. The metadata server 220 detects that the web site for which the metadata is being requested is one of the subject web sites for which related links have been identified. At a step 610 the metadata server responds to the request by retrieving the list of related links associated with the subject web site and incorporating the related links into a metadata page. The metadata server 220 then transmits the metadata page to the client program 214. The client program 214, in turn, displays the metadata page 214, including the related links, to the user.

The process illustrated in flowchart 600 can also or alternatively be adapted to provide related links for web pages, in addition to or in place of related links for web sites. Furthermore, the present process could be adapted in accordance with the various alternatives described with reference to flowcharts 300 and 500. For example, in accordance with the process of flowchart 600, related links could be identified based upon directional transitions.

In additional embodiments, the presentation of related links to the user can take different forms. These other forms need not involve the use of a client program 214 through which to display the metadata. For example, a search engine may present a list of related links for each link in a results set.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the appended claims. In the claims, the term "web location" will be used to refer to a web site, a web page, or another item of interest accessible on the web. In the method claims, reference characters are used for convenience of description only, and do not indicate a particular order for performing the method.

What is claimed is:

1. A computer system, comprising:
    a usage trail data accumulator configured to collect usage trail data descriptive of usage trails of a plurality of users, said usage trail data identifying sequences of network resources accessed by corresponding users during network browsing sessions of such users; and
    a metadata generator configured to analyze the usage trail data collected by the usage trail data accumulator and to generate scores that represent degrees of relationship between specific network resources, said scores being normalized values falling within a bounded range, and being dependent upon the usage trails of the plurality of users.

2. The computer system of claim 1, wherein the metadata generator is configured to generate a score that represents a degree of relationship between a first network resource and a second network resource in-part by determining a total number of transitions that occurred between the first network resource and the second network resource, as determined from the usage trail data.

3. The computer system of claim 2, wherein the first and second network resources are respective web sites.

4. The computer system of claim 2, wherein the first and second network resources are respective web pages.

5. The computer system of claim 2, wherein the metadata generator is configured to determine said total number of transitions such that at least some multi-step transitions are counted.

6. The computer system of claim 2, wherein the metadata generator is configured to determine said total number of transitions such that only N-step to M-step transitions are counted, where N and M are selected integers.

7. The computer system of claim 2, wherein the score is further dependent on a total number of transitions that occurred in said usage trails between the first network resource and all other network resources of a like type.

8. The computer system of claim 7, wherein the score is further dependent on a total number of transitions that occurred in said usage trails between the second network resource and all other network resources of a like type.

9. The computer system of claim 2, wherein the score is further dependent upon whether a direct link exists between the first and second network resources.

10. The computer system of claim 2, wherein the metadata generator is configured to generate said score taking into consideration, for a given usage trail that includes an access to the first network resource and an access to the second network resource, an amount of time that elapsed between the access to the first network resource and the access to the second network resource.

11. The computer system of claim 1, wherein the metadata generator uses a minimum sensitivity calculation to generate the scores.

12. The computer system of claim 1, wherein the usage trail data accumulator is configured to collect the usage trail data using a browser plug-in that runs on user computers and reports browsing actions of corresponding users.

13. The computer system of claim 1, wherein the bounded range is 0 to 1.

14. A computer-implemented data mining method, comprising:
    storing usage trail data descriptive of usage trails of a plurality of users, each usage trail identifying a sequence of network resources accessed by a corresponding user during a browsing session; and
    programmatically generating a score that represents a degree to which a first network resource and a second network resource are related to each other, said score falling within a predefined, bounded range, and being dependent upon a total number of transitions in said usage trails between the first network resource and the second network resource as determined from the usage trail data, whereby the score reflects browsing behaviors of users.

15. The method of claim 14, wherein the first and second network resources are respective web sites.

16. The method of claim 14, wherein the first and second network resources are respective web pages.

17. The method of claim 14, wherein said total number of transitions is determined such that at least some multi-step transitions are counted.

18. The method of claim 14, wherein the total number of transitions is determined such that only N-step to M-step transitions are counted, where N and M are selected integers.

19. The method of claim 14, wherein the score is further dependent on a total number of transitions in said usage trails between the first network resource and all other network resources of a like type.

20. The method of claim 19, wherein the score is further dependent on a total number of transitions that occurred in said usage trails between the second network resource and all other network resources of a like type.

21. The method of claim 14, wherein programmatically generating the score comprises using a minimum sensitivity calculation to generate the score.

22. The method of claim 14, wherein programmatically generating the score comprises taking into consideration whether a direct link exists between the first and second network resources, as determined from an automated analysis of web page content.

23. The method of claim 14, wherein programmatically generating the score comprises taking into consideration, for a given usage trail that includes an access to the first network resource and an access to the second network resource, an amount of time that elapsed between the access to the first network resource and the access to the second network resource.

24. The method of claim 14, further comprising collecting the usage trail data using a browser plug-in that runs on user computers and reports browsing actions of said users.

25. The method of claim 14, wherein the predefined, bounded range is 0 to 1.

* * * * *